(No Model.)
R. H. MATHER.
COUPLING SHUNT FOR DYNAMO ELECTRIC MACHINES.
No. 286,325. Patented Oct. 9, 1883.
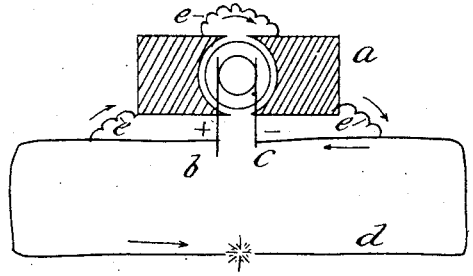
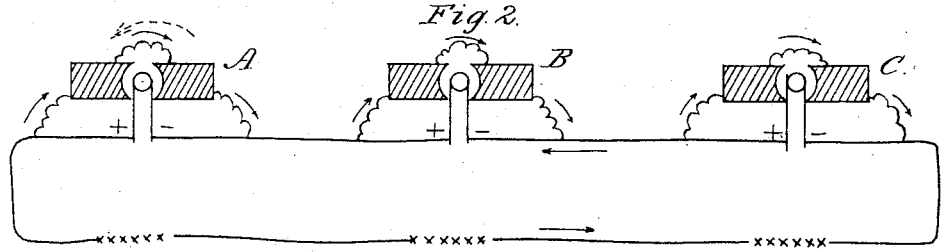
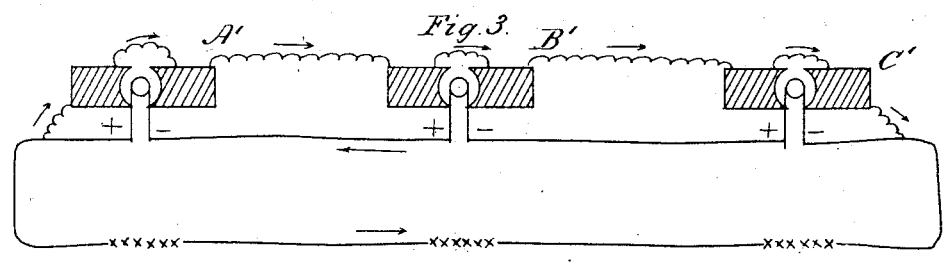
Witnesses:
Walter J. Bunce.
Albert C. Tanner
Inventor:
R. H. Mather
By W. E. Simonds,
Atty

UNITED STATES PATENT OFFICE.

RICHARD H. MATHER, OF WINDSOR, CONNECTICUT.

COUPLING SHUNT DYNAMO-ELECTRIC MACHINES.

SPECIFICATION forming part of Letters Patent No. 286,325, dated October 9, 1883.

Application filed August 10, 1882. (No model.)

*To all whom it may concern:*

Be it known that I, RICHARD H. MATHER, of Windsor, in the county of Hartford and State of Connecticut, have invented certain new and useful Improvements in Coupling Shunt Dynamo-Electric Machines, of which the following is a description, reference being had to the accompanying drawings, where—

Figure 1 is a diagram view of a shunt dynamo-electric machine, showing the method of joining the wires, and by arrows the direction of the currents. Fig. 2 is a diagram view of several of such machines, shown as coupled in such manner that the field-magnet coils of each machine form the shunt to its own armature. Fig. 3 is a diagram view of the same coupled in series, so that the field-magnet coils form a shunt to each and all the armatures.

My invention relates to the use of shunt dynamo-electric machines when two or more of such machines are coupled to form a battery.

It consists in the improved method of coupling the machines in series in such manner that the field-magnet coils of the whole battery form a shunt to the whole circuit—*i. e.*, all the machines—and not each magnet a shunt to its own armature.

It is often desirable in practice to join several dynamo-electric machines in series, so as to obtain their joint electro-motive force. This in the case of single-circuit machines (those in which the field-magnet coils are arranged in the same circuit with the external work) presents no difficulties, as all that is necessary is to join the positive pole of one machine with the negative pole of the next machine, and so on with the remaining machines, the two free poles of the series being positive and negative, respectively. This plan is impracticable when we attempt to so join in series shunt dynamo-machines (those in which the field-magnet coils are arranged as a derivation or shunt to the armature exciting it) without a rearrangement of the circuits. If joined in the above-mentioned way, the following difficulties arise: If one of the machines in a series so joined should stop or have its speed momentarily lessened, it would be reversed by the other machines—that is, the initial magnetism which serves to start the machine would be reversed. If one of the brushes of one of the machines failed to make contact with its commutator, as by the slipping of a clamping-screw while the machines were running, that machine would be reversed instantly. If the end of a brush be burned off, the machine to which it belongs will be reversed. If the machines be started before all the brushes are placed on their respective commutators, all the machines but the one having its brushes first placed will be reversed, and, more than this, two shunt-machines so coupled must be started at the same instant, increased in speed at uniform rates, and reach the ordinary rate at the same instant and maintain it uniformly—an obvious impracticability. This reversal of currents in any one machine in a series would cause that machine, when it should arrive at its normal speed, to send a current through the working-wires in a contrary direction to that from the other machines, and so neutralize the work of two machines in the series, and to this is the added risk of burning out the field-magnet coils by the powerful concentrated currents from the other machines turned through them when the current from one brush to the other is interrupted in the said machine.

In the accompanying drawings, the letter $a$ denotes a shunt dynamo-electric machine; $b$, the positive brush; $c$, the negative brush; $d$, the working-wires, shown by heavy lines; and $e$ the wires of the field-magnet coils, shown by lighter and irregular lines. The machine being in operation, the currents through the work and the magnet coils take the directions shown by the arrows near the respective parts.

In Fig. 2 three similar shunt-machines, A B C, are shown as coupled so that the magnet-coils of each form a shunt to each machine. In this faulty method of coupling any of the causes already stated may result in a reversal of the currents in the field-magnet coils, as shown in A by dotted arrow. In Fig. 3 similar machines, A′ B′ C′, are shown properly joined, to avoid the difficulties recited, the shunt-current being clearly shown, and also the fact that interruptions of the working of any machine in the series will not affect the direction of the shunt-circuit.

I am aware that it has been proposed to couple a series of dynamos having bobbins all fast on a single shaft in a similar manner, and this I do not claim. By the term "independently operated," in the following claim, I mean a series of dynamos having each its own armature not connected, as to its journal, with that of the adjacent machines.

I claim as my invention—

A battery of independently-operated shunt dynamo-electric machines having the armatures joined in series, and the field-magnet coils of all the machines also joined in series, whereby all the field-magnets are made a shunt to the entire series of armatures, all substantially as described, and for the purpose set forth.

RICHARD H. MATHER.

Witnesses:
W. H. BUNCE,
A. C. TANNER.